June 3, 1958 P. BARTHE 2,837,606

ANNOUNCING METHOD AND APPARATUS

Filed March 14, 1955 2 Sheets-Sheet 1

INVENTOR
Paulette Barthe
By Holcombe, Wetherill & Brisebois
ATTORNEYS

June 3, 1958 P. BARTHE 2,837,606

ANNOUNCING METHOD AND APPARATUS

Filed March 14, 1955 2 Sheets-Sheet 2

INVENTOR
Paulette Barthe
By Holcombe, Wetherill & Brisebois
ATTORNEYS

United States Patent Office 2,837,606
Patented June 3, 1958

2,837,606

ANNOUNCING METHOD AND APPARATUS

Paulette Barthe, Paris, France

Application March 14, 1955, Serial No. 494,135
Claims priority, application France March 17, 1954
6 Claims. (Cl. 179—100.1)

Figure 3:
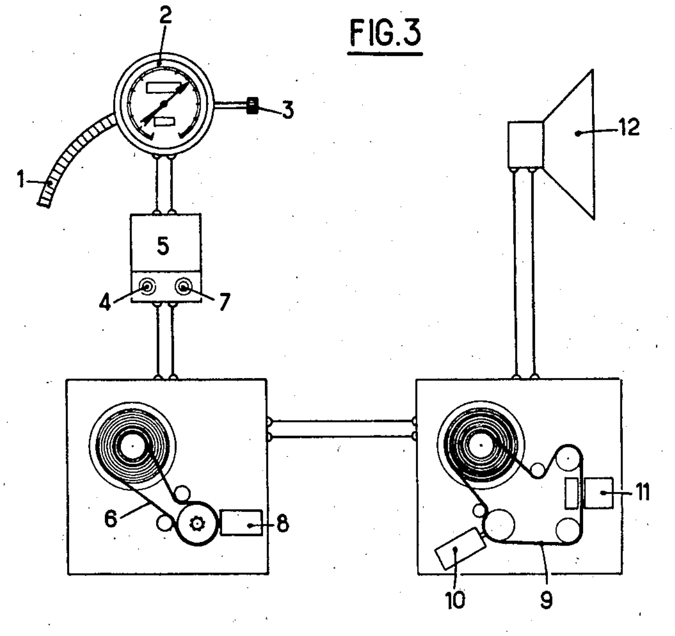

The present invention relates to an announcing method and apparatus for all types of vehicles used as public or private conveyances, for example railways, buses, touring cars and aircraft.

Whatever the type, the itinerary and the destination of those vehicles, the passengers are generally left in ignorance of all information which may be of interest to them. Some of this information is of general interest: for instance the next station where the bus must or may stop, the point of access to a new section or fare-stage; the towns and the country sites through which the vehicle proceeds, or information which makes the journey pleasant or useful. Of special interest, for passengers coming from the provinces or from foreign parts are short communications of a practical nature answering the needs or the curiosity of every thinking and intelligent passenger.

The present invention provides an automatic announcing device, which satisfies the natural wish of such people to be given information.

In its preferred embodiment the invention includes all the information regarding the itinerary of a vehicle, then automatically, as the vehicle approaches the appropriate points on its routes it announces the relative information.

The above considerations illustrate the particular and instructive character of the invention, and, the general idea thereof being known, a better understanding will be gathered of the means employed for its reduction to practice.

According to those means, a recording is made beforehand of the sounds (more specially the language) intended for giving an announcement when reproduced on the vehicle, of the circumstances deemed pertinent and characteristic of the itinerary.

The records will possibly be made on phonograph discs or magnetic wire or tape, and the use of a magnetic tape will be described later on as a mere non-limitative example, as it should be understood that the invention applies to all the reproducing systems of sound records whatever may be the means used for their production or their reproduction.

In its most general aspect, the invention does not employ any fixed marks along the path of the vehicle, and it is by its own means that the equipment keeps a perfect knowledge of its position so that it is able to cause, by appropriate mechanisms, the reproduction of words recorded in advance in order to accurately mark the approach of the vehicle towards a given position.

It is through the use of a pilot-tape that the vehicle records its position at each moment, and, assuming that tape is made of an insulating textile material for instance, it can easily be understood that it carries at suitable points some contacts (or equivalent devices) starting at desired times the reproduction of words recorded in advance.

If the recorder-reproducer is a magnetic machine the "broadcasting" on the vehicle will be started by the action of the pilot-tape on the magnetic wire or tape. The said action will consist in rotating the motor of the machine and that motor will be stopped by the sound-carrier itself at the end of the announcement.

Thus the pilot-tape is fed according to the rate of movement of the vehicle, so that it reproduces on a reduced scale the displacement thereof. The ribbon of the recorder and reproducer is controlled by the pilot-tape at the beginning of each announcement (so that they start automatically at the desired point of the vehicle path). As soon as the announcement is ended (after having lasted as long as the recording for a phonic reproduction of good quality), the instantaneous action of an end mark of the transmission, carried by the sound carrying ribbon and marked at the time of the recording, stops the motor of the machine which will be started only after the next operation of the pilot-tape.

This latter may consist, as does also the sound carrier of the magnetic recorder and reproducer, in an endless strip as will be better understood from the following description.

Figure 1:
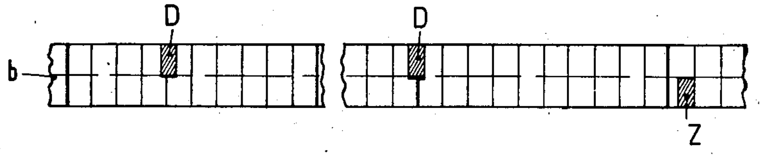

The characteristics and advantages of the invention will appear more clearly from the following drawings and the corresponding description, given as a non-limitative example in consideration of various applications arising from the same principles. In the drawings:

Fig. 1 shows two sections of a pilot-tape the driving means of which will be described later on.

Fig. 2*a* shows diagrammatically with regard to distance and time coordinates, the running of a vehicle equipped according to the invention (OZ for the going journey Z'O' for the return journey).

Fig. 2*b* shows, conventionally, in the form of pulses D and Z the points marking the coming into action and stopping of the pilot-tape corresponding to the displacements OZ and Z'O' of Fig. 2*a*.

Figs. 2*c* and 2*d* illustrate the performance of the sound-carrying strip, the transmitting periods of which follow one another along the vehicle paths OZ and Z'O', the said periods corresponding to horizontal hatched sections, separated by blank spaces marking the points where there is no recording.

Figure 4:
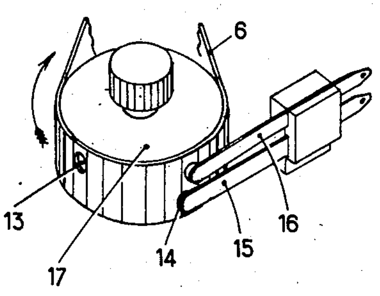

Figs. 3 and 4 illustrate one embodiment of apparatus according to the invention.

The satisfactory working of the pilot-tape *b* of Fig. 1 may be obtained in various ways; and as an instance it can be obtained from a motor-wheel or a trailer, from an axle, from a pulley or a pinion run from that axle. In most cases it will be preferable to start from a distance recorder 2 as shown in Fig. 3. In all cases according to the invention, the tape will be started, at the desired starting point, through the operation of a simple switch, the pressing of a knob for instance. If the tape *b* is made of an insulating material (a fabric for instance), it will carry, fixed on one of its edges, contacts D which will mark the starting of each announcement. On the other edge of the tape is seen a contact Z which is employed when the vehicle has completed its journey.

Figure 2:
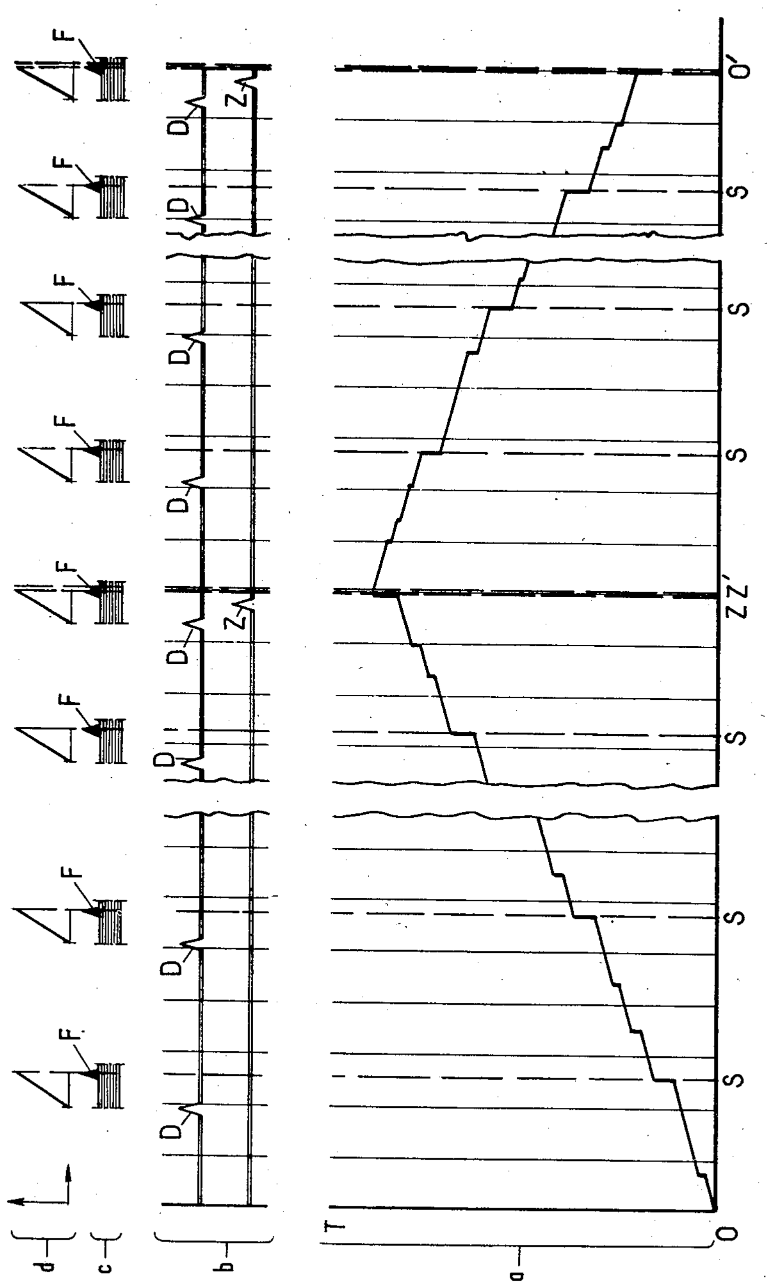

The diagrams (*a*) to (*d*) of Fig. 2 give a better understanding of the effects from the various elements of an equipment according to the invention:

At (*a*) is shown the graphic representation, in coordinates of distance and time, of the double journey OZ, Z'O' of the vehicle. Ordinates OT correspond to the times, the vertical segments of the graph *a* corresponding to the duration of the stops, generally shorter if they correspond to accidental stops than to stopping stations designated by S on the axis of the abscissae.

On the graph *b* corresponding to the pilot-tape, have been represented by pulses or pips the particular points that Fig. 1 presented in another aspect; later will be shown the mechanism can secure in the simplest way the necessary conditions: i. e. the terminus stop Z and the start of announcements D related to the S stations which it is their main duty to announce before the corresponding stops. It is on the assumption, of an anticipated indication of the stations by an announcement ending at the stopping time, that have been shown: on the one hand the shift between the start of an announcement and on the other hand the coincidence, of the stations S of the graph with the end of announcements F. It is also by way of simplification (which is in no way compulsory) that the duration of the announcement has been represented as unchanging at *d* in Fig. 2. The end of the announcement is not controlled either by the stopping of the vehicle at a station, or by any intervention other than that of an appropriate contact controlled by the only sound carrying band *c*.

Fig. 3 clearly shows how two endless tapes 6 and 9, a distance meter 2 and a loud speaker 12 may be installed on a vehicle to constitute an autonomous vehicle fully performing the object of the invention. The loudspeaker has been shown separately to show there is no necessity to include it in the magnetic recorder or reproducer, whilst any recording-reproducing system may be adopted, and if the principle of the magnetic machine is chosen, it is possible to modify the equipment if it appears that some alterations are desired (as will probably be the case for the installations to be placed on railroad trains and to probably include several loudspeakers).

The operation of the devices shown in Fig. 3 may be explained as follows. Although the distance meter 2 is controlled by its driving device 1, the running of the vehicle does not drive the pilot-tape 6, unless the starting impetus is given to this latter by a pressure of the finger on the knob 4 (the effect of which can, moreover, be annulled by pressure on the knob 7). Once the tape has been started the relay 5 ensures its operation until the automatic stop is insured by the stopping device Z at the terminus. 8 is an automatic interrupter shown in detail in Fig. 4.

On the sound carrier 9 of Fig. 3 operate, on the one hand the end-of-announcement relay 10 corresponding to F in Fig. 2*d*; on the other hand the pick up 11, the output of which is, after a suitable amplification, sent to the loudspeaker 12.

If one considers more accurately the automatic control devices 10 and 8 (which may be similar to each other), one can easily image various embodiments: to both may be applied for instance the very simple principle which, in order to act on a relay circuit, uses the insulating effect of a tape, normally inserted between two conducting elements of that circuit, those elements contacting together and closing the circuit at the passage between them of a slot or of a plain hole in the tape.

The adaptation of such a device to produce a switch 8 controlling properly the stopping pulses Z and those of the starting points of announcements D could for instance, be of the shape shown by Fig. 4, in which can be seen the pilot-tape 6 running around a pulley 17, and provided with as many holes 13 as there are pulses D necessary, and in the plane of the holes an interrupting contact 16. A similar contact 15 acts in the same way in the lower plane of the holes 14 or stopping contact Z (it being understood that the two contacts differ essentially by their functions and connections since one of them controls the putting into action of the sound carrier band while the other controls the stops of the other band).

I claim:

1. Announcing apparatus for installation on a vehicle, comprising a record medium bearing prerecorded announcements and physical configurations for initiating the operation of a first switch device, a motor for driving said record medium, a carrier member bearing pilot signals in the form of physical configurations for initiating the operation of a second switch device, means for driving the carrier member in synchronism with the running of the vehicle, means for reproducing the pre-recorded announcements from the record carrier, means for starting the motor to reproduce a pre-recorded announcement through said reproducing means upon operation of said second switch device by a pilot signal in the form of a physical configuration on said carrier member, and means for switching-off said motor at the end of a reproduced announcement by the operation of said first switch device by a physical configuration on said record medium following that announcement.

2. Apparatus as claimed in claim 1, in which the record medium comprises magnetic tape and the physical configurations comprise holes in the tape.

3. Announcing apparatus for installation on a vehicle, comprising a record medium in the form of an endless tape bearing pre-recorded announcements and physical configurations for initiating the operation of a first switch device, a motor for driving said record medium, a carrier member in the form of an endless tape bearing pilot signals in the form of physical configurations for initiating the operation of a second switch device, means for driving the carrier member in synchronism with the running of the vehicle, means for reproducing the pre-recorded announcements from the record carrier, means for starting the motor directly to reproduce a pre-recorded announcement through said reproducing means upon operation of said second switch device by a pilot signal in the form of a physical configuration on said carrier member, and means for switching off said motor directly at the end of a reproduced announcement by the operation of said first switch device by a physical configuration on said record medium following that announcement.

4. Announcing apparatus for installation on a vehicle, comprising a record medium bearing pre-recorded announcements and physical configurations for initiating the operation of a first switch device, a motor for driving said record medium, a carrier member bearing pilot signals in the form of physical configurations for initiating the operation of a second switch device, means for driving the carrier member in synchronism with the running of the vehicle, means for disengaging the carrier member from the driving means, means for reproducing the pre-recorded announcements from the record carrier, means for starting the motor directly to reproduce a pre-recorded announcement through said reproducing means upon operation of said second switch device by a pilot signal in the form of a physical configuration on said carrier member, and means for switching off said motor at the end of a reproduced announcement by the operation of said first switch device by a physical configuration on said record medium following that announcement.

5. Apparatus as claimed in claim 4, comprising also distance indicating means associated with said means for driving the carrier member.

6. Apparatus as claimed in claim 4, comprising means on said carrier member, for operating said disengaging means at a predetermined instant.

References Cited in the file of this patent

UNITED STATES PATENTS 2,501,048 Haller ............... Mar. 21, 1950